(12) United States Patent
Yamaoku et al.

(10) Patent No.: US 6,797,917 B1
(45) Date of Patent: Sep. 28, 2004

(54) LASER MACHINING HEAD

(75) Inventors: Hiroaki Yamaoku, Tokyo (JP); Masahiko Hasegawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 151 days.

(21) Appl. No.: 10/203,520

(22) PCT Filed: Aug. 31, 2000

(86) PCT No.: PCT/JP00/05907
§ 371 (c)(1),
(2), (4) Date: Aug. 12, 2002

(87) PCT Pub. No.: WO02/18091
PCT Pub. Date: Mar. 7, 2002

(51) Int. Cl.⁷ .............................................. B23K 26/08
(52) U.S. Cl. ................................................ 219/121.67
(58) Field of Search ........................ 219/121.6, 121.63, 219/121.65, 121.67, 121.68, 121.7, 121.84

(56) References Cited
U.S. PATENT DOCUMENTS
6,600,133 B2 * 7/2003 Watanabe et al. ........ 219/125.1

FOREIGN PATENT DOCUMENTS
JP          411138289 A   *  5/1999

* cited by examiner

Primary Examiner—Samuel M. Heinrich
(74) Attorney, Agent, or Firm—Sughrue Mion, PLLC

(57) ABSTRACT

A laser beam machining head comprises a first machining head section having a flange in a first end part in a direction along an optical axis direction of laser light and having a laser light emission nozzle in a second end part, a second machining head section having an engaged part engaged with the above-mentioned flange of the first machining head section for detachably holding the above-mentioned first machining head section, and an O ring being engaged in an engagement part placed in an outer peripheral surface of the above-mentioned flange opposed to an inner peripheral surface of the above-mentioned engaged part and pressed against the inner peripheral surface of the above-mentioned engaged part, whereby when the first machining head section collides with an obstacle, a breakage prevention function reliably operates for preventing not only damage to the first machining head section, but also damage to the whole laser beam machining head, and in the normal state, the first machining head section is held and fixed reliably.

4 Claims, 4 Drawing Sheets

US 6,797,917 B1

LASER MACHINING HEAD

TECHNICAL FIELD

This invention relates to a movable laser beam machining head used with a three-dimensional laser beam machine, etc.

BACKGROUND OF THE INVENTION

FIG. 4 is a sectional view to show a laser beam machining head in a related art shown in JP-A-7-178546, etc., for example. In FIG. 4, laser light L emitted from a laser oscillator (not shown) passes through an optical path 6 and is incident on a torch main unit 1 forming a machining head section and then is emitted through a hole of a nozzle section 7 for machining a workpiece (not shown) to be worked on.

It has a flange 4 forming a part of the torch main unit 1 and comprising a magnet 8, a switch 5, and a through hole 10 at predetermined positions and a bracket 2 having a groove 3 being formed corresponding to the shape of the flange 4 and comprising an inner wall 3a and inner bottom 3b and comprising a magnetic substance 9 and a screw 11 and an elastic member 12 corresponding to the magnet 8 and the through hole 10 and the flange 4 is fitted into the groove 3 and they are joined by the magnetic force of the magnet 8 and the magnetic substance 9, whereby the bracket 2 holds the torch main unit 1.

In the described structure, if some obstacle, for example, a workpiece collides with a tip nozzle part 7, etc., at the tip of the torch main unit 1 and an impulsive force exceeding the fixing force produced by the magnetic force of the magnet 8 and the magnetic substance 9 is applied to the torch main unit 1, to prevent the machining head section from being broken by the impulsive force, the magnet 8 and the magnetic substance 9 are detached, the upper face of the flange 4 in an opposite direction to the portion with which the obstacle comes in contact presses an elastic member 12, and the flange 4 lifts up from the groove 3 of the bracket 2 and is detached.

As for the torch main unit 1 having the flange 4 once detached from the groove 3 as described above, after avoidance from the obstacle or removal of the obstacle, the flange 4 is pressed by the elastic member 12 and is again fitted into the groove 3 and they are magnetically fixed by the magnet 8 and the magnetic substance 9 and the torch main unit 1 is restored to the former state.

In fact, however, after the flange 4 is detached from the original fit state and a part of the flange 4 lifts up, the flange 4 may be caught in a state in which it runs on an upper margin face 2a of the bracket 2 and there is a problem of not performing smooth restoration operation. If a fit gap is made large so as to prevent the flange 4 and the upper margin face 2a from being caught in, there is a problem of degrading the centering accuracy.

In recent years, in the laser beam machine, speeding up and high acceleration of the machining operation have been going to move with performance improvement of the laser beam machine. With a three-dimensional laser beam machine, a nozzle is rotated not only downward, but also usually horizontally. The fixing force of a magnet, etc., needs to be made large so that the torch main unit 1 having a large mass and the tip nozzle part 7 are not placed out of position with a move (particularly acceleration) at the machining time. On the other hand, if the fixing force is made excessively strong, a shock cannot sufficiently be absorbed at the collision time with an obstacle and the tip nozzle part 7 may be often broken by the impulsive force before the torch main unit 1 is inclined. Focusing attention on this point, the fixing force cannot be set much strong; this is a problem.

The invention is intended for solving the problems described above and it is an object of the invention to provide a laser beam machining head wherein according to a simple structure, a breakage prevention function reliably operates for preventing damage to a machining head section and the machining head section once placed out of engagement can be reliably restored to the former engagement state.

DISCLOSURE OF THE INVENTION

According to the invention, there is provided a laser beam machining head comprising a first machining head section having a flange in a first end part in a direction along an optical axis direction of laser light and having a laser light emission nozzle in a second end part, a second machining head section having an engaged part engaged with the above-mentioned flange of the first machining head section for detachably holding the above-mentioned first machining head section, and an O ring being engaged in an engagement part placed in an outer peripheral surface of the above-mentioned flange opposed to an inner peripheral surface of the above-mentioned engaged part and pressed against the inner peripheral surface of the above-mentioned engaged part.

According to the above-described structure, the breakage prevention function reliably operates for preventing damage to the machining head section and the machining head section once placed out of engagement can be reliably restored to the former engagement state.

According to the invention, the laser beam machining head wherein the engaged part is formed with a tapered part is provided.

According to the above-described structure, the machining head section is restored to the former engagement state more reliably and smoothly.

BEST MODE FOR CARRYING OUT THE INVENTION

First embodiment

Figure 1:
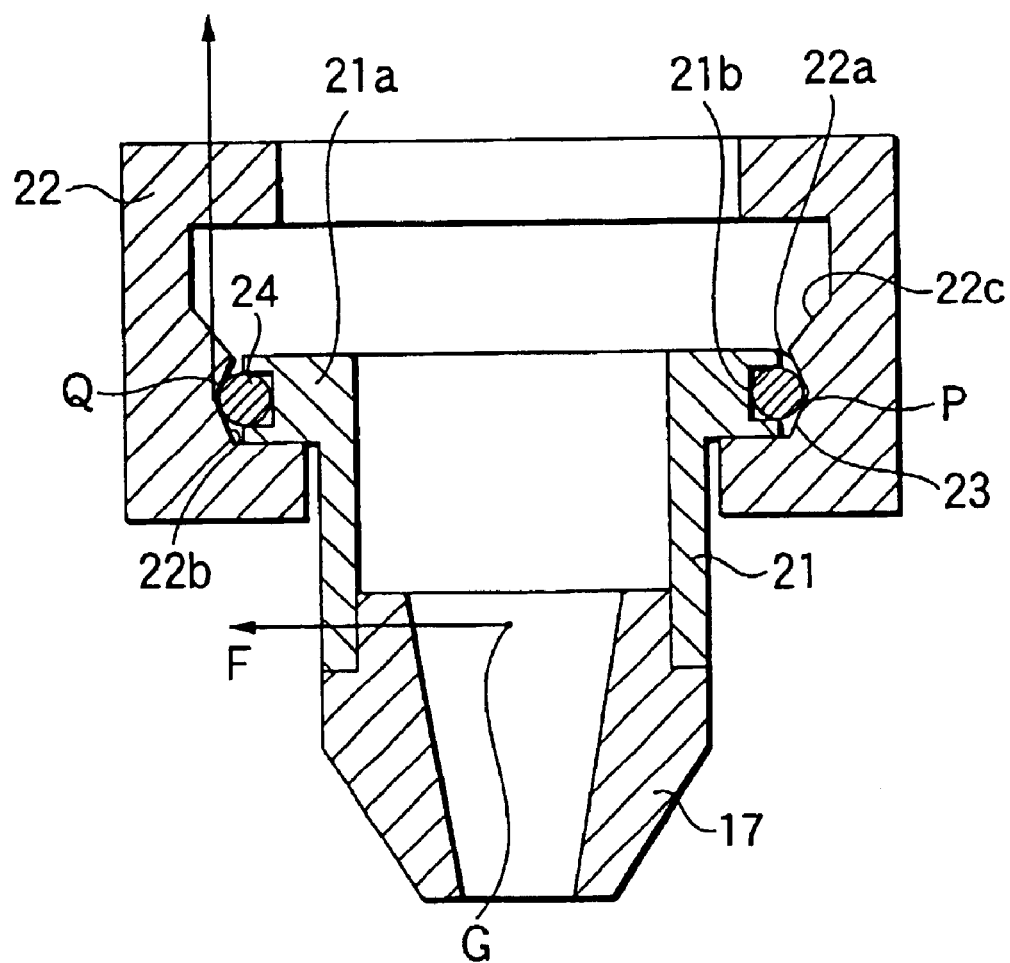
FIG. 1 is a sectional view of the main part of a laser beam machining head according to a first embodiment of the invention in a state in which a flanged pipe is engaged.
Figure 2:
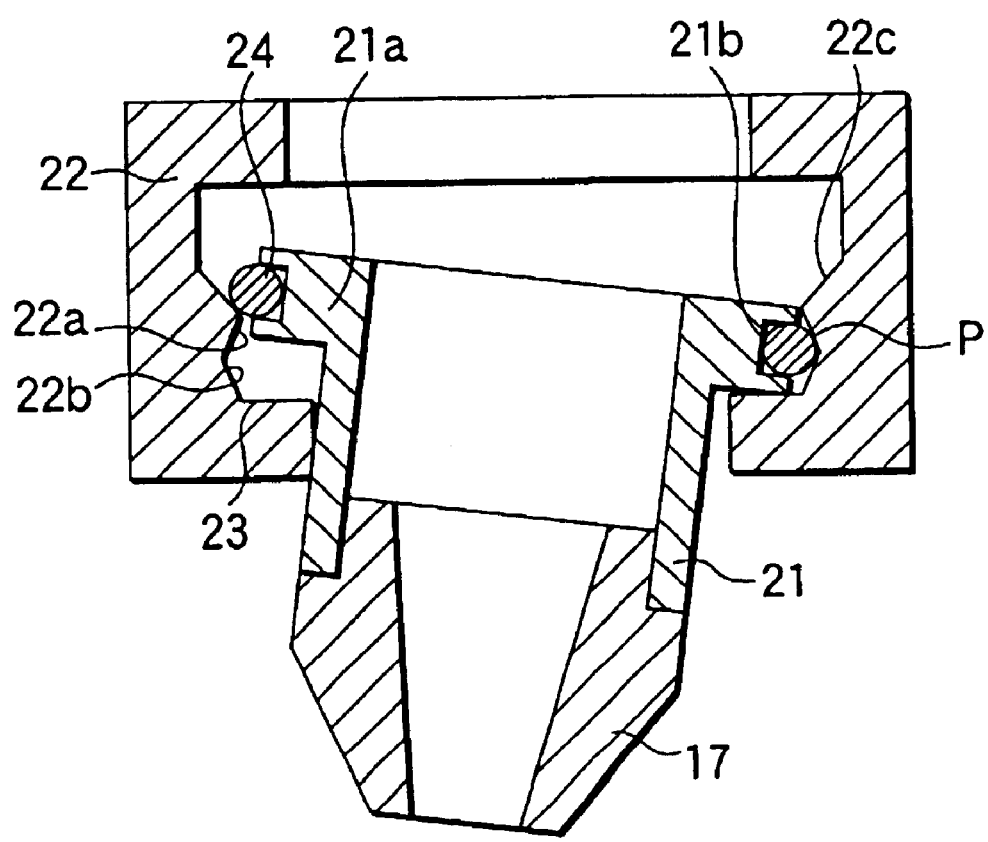
FIG. 2 is a sectional view of the main part of the laser beam machining head according to the first embodiment of the invention in a state in which the flanged pipe is inclined.

FIGS. 1 and 2 are sectional views of the main part to describe a laser beam machining head according to a first embodiment of the invention. FIG. 1 shows a state in which a flanged pipe is engaged with a hollow cage member and FIG. 2 shows a state in which the flanged pipe is disengaged from the hollow cage member and is inclined.

In FIG. 1, numeral 21 denotes a flanged pipe as a first machining head section to which a tip nozzle section 17 as a laser light emission nozzle is attached at a lower end and which has a flange 21a at an upper end, and numeral 22 denotes a hollow cage member as a second machining head section wherein the flange 21a is fitted into a fit groove 23 and supported and fixed. The hollow cage member 22 supports and fixes the flanged pipe 21 via an O ring 24 having elasticity, inserted between an engagement part 21b of the flanged pipe 21 and a press contact recess part 22a of the hollow cage member 22.

The O ring 24 is engaged in the engagement part 21b and the press contact recess part 22a of the hollow cage member 22 is formed with a support part 22b shaped like a concave form to such an extent that the O ring 24 is slightly crushed. The press contact recess part 22a is formed at an upper part with a tapered part 22c.

To fix the flanged pipe 21 to the hollow cage member 22, the O ring 24 rather than a magnet is used, so that reliable detachment of the flanged pipe 21 from the hollow cage member 22 upon reception of a given or more impulsive force is made possible in the simple structure.

As shown in FIG. 1, gravity changed in an action direction by the accelerating force and rotation acts on the center of gravity G of moving parts containing the flanged pipe 21, the tip nozzle section 17 attached thereto, etc. In this case, the moment of a point Q moving upward with a point P as a supporting point acts, causing the flanged pipe 21 to be inclined. However, a force F acting on the center of gravity G acts on the press contact part 22a via the O ring 24 and thus the force of the press contact part 22a for holding the O ring 24 grows in proportion to the force F. Therefore, the O ring 24 is not detached from the support part 22b of the press contact part 22a.

The case where a workpiece (not shown) abuts the tip nozzle section 17 and the flanged pipe 21 is inclined as shown in FIG. 2 will be discussed.

The flanged pipe 21 is inclined with the contact point P between the O ring 24 and the concave support part 22b to hold the O ring 24 as a supporting point. If the O ring 24 runs on the press contact recess part 22a as the flanged pipe 21 is inclined, the press contact recess part 22a is formed at the upper part with the tapered part 22c and the O ring 24 in contact with the surface of the tapered part 22c is made of a material having elasticity and a smooth surface and thus a situation in which a bracket (corresponding to the hollow cage member 22) and a flange are made of hard material and an edge part of the flange is caught in a taper face of the bracket as in the related art example does not occur, so that a situation in which the flanged pipe 21 once inclined is left in a state in which it is inclined (placed out of the original position) does not occur and the O ring 24 slides smoothly on the tapered part 22c downward and consequently it is made possible for the flanged pipe 21 to be restored to and fitted into the original position with good repeatability.

Second Embodiment

FIG. 1 is a sectional view of the main part to describe a laser beam machining head according to a second embodiment of the invention.

Figure 3:
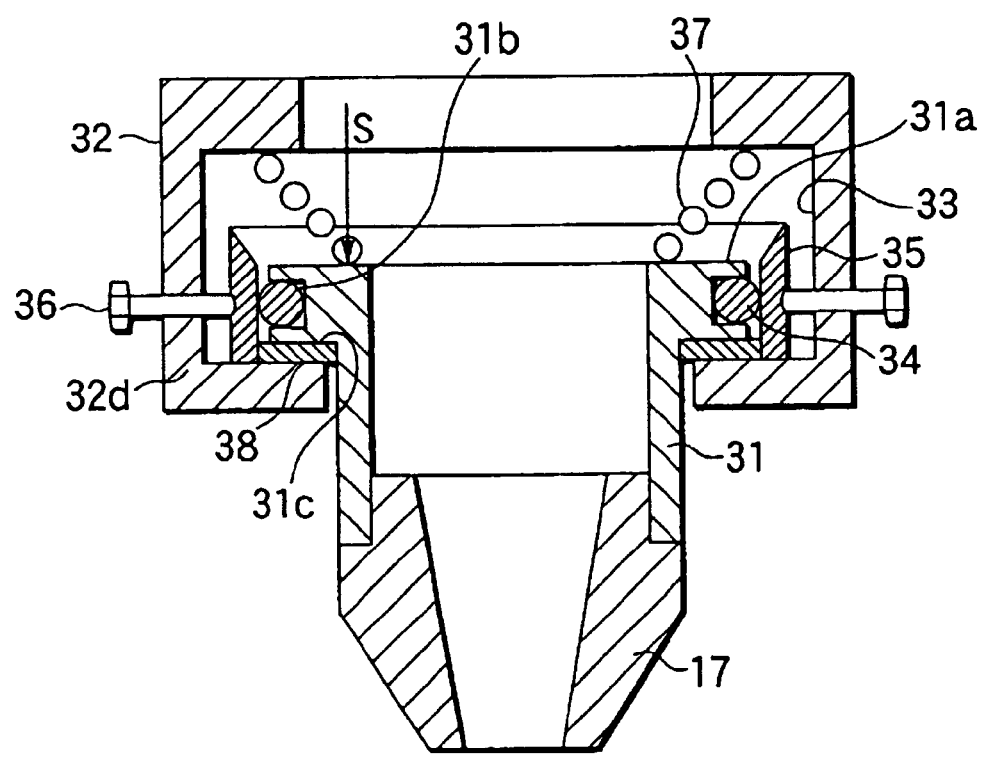
FIG. 3 is a sectional view of the main part of a laser beam machining head according to a second embodiment of the invention.
Figure 4:
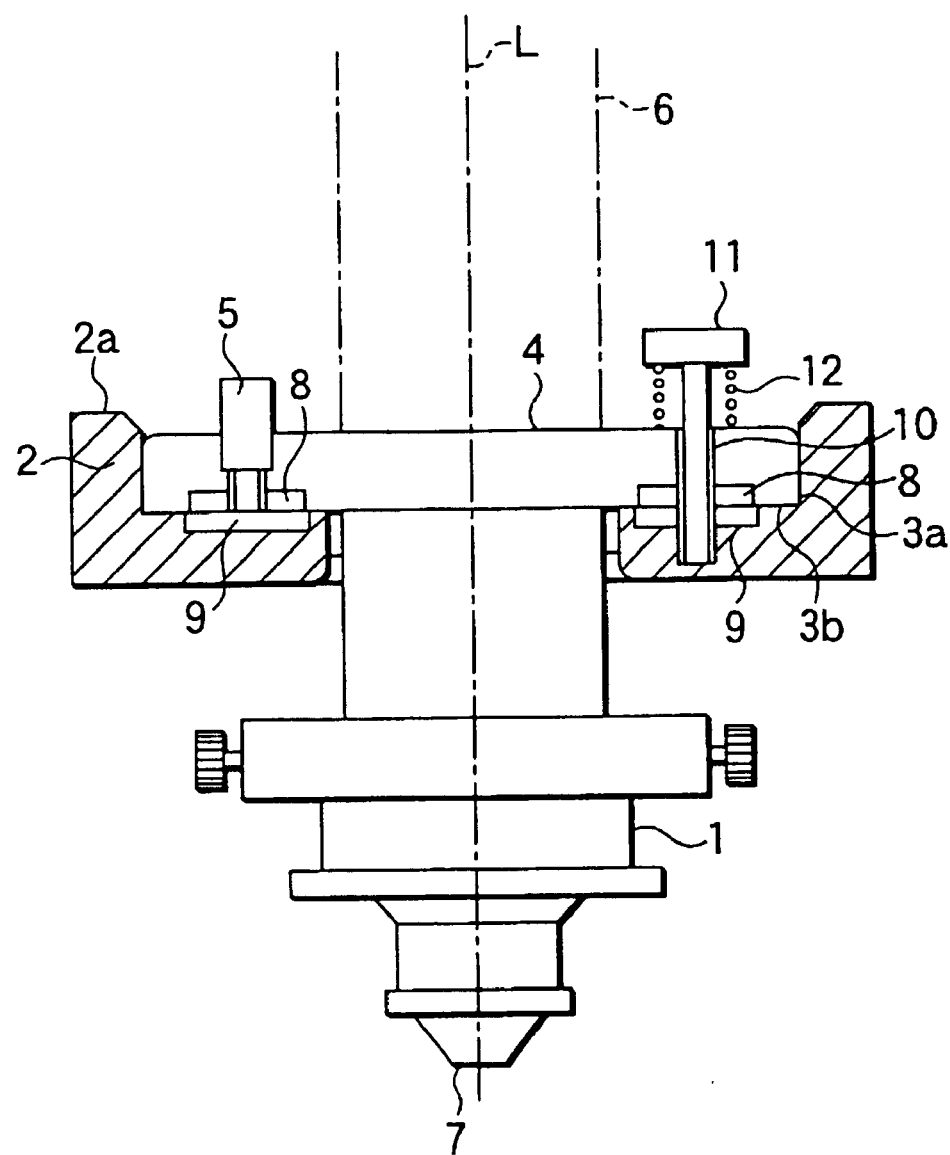
FIG. 4 is a sectional view of the main part of a laser beam machining head in a related art.

Parts identical with or similar to those in FIGS. 1 and 2 are denoted by the same reference numerals in FIG. 3 and therefore will not be discussed again in detail.

In FIG. 3, a flanged pipe 31 is pressed against the inner face of a hollow cage member 32 by a spring 37. Numeral 35 denotes a ring-like member formed in an inner upper part with a taper (which will be hereinafter referred to as taper ring whenever necessary) comprising a positioning function, an independent engagement member provided by separating an engagement mechanism from the cage member 32, numeral 36 denotes an adjustment screw attached to the hollow cage member for adjusting the position of the taper ring 35, and numeral 38 denotes a slip sheet functioning as a low-friction coefficient face, inserted between a contact face 32d of the cage member 32 and a contact face 31c of a flange 31a.

Numeral 33 denotes a fit groove. As for the fit groove in the embodiment unlike that in the first embodiment described above, the dimension accuracy between the flange 31a and the fit groove 33 is not required as the strict dimension accuracy as in the first embodiment because the positioning taper ring 35 and the adjustment screw 36 for adjusting the position of the taper ring 35 are placed on the outer peripheral side of an O ring 34 engaged in an engagement part 31b of the flanged pipe 31.

When the spring 37 presses the flange 31a, if the contact face 31c of the flange 31a and the contact face 32d of the hollow cage member 32 are in direct contact with each other, a friction force acts between the contact face 31c and the contact face 32d. Particularly, once inclined, the edge part of the flange 31a applies a concentrated load to the contact face 32d. Thus, the friction force at the point grows and if abutment is released, automatic restoration is not accomplished unless the press force of the spring 37 is made large. Then, the slip sheet 38 having a low friction coefficient is placed between the contact face 31c and the contact face 32d, whereby smooth position restoration is made possible without enlarging the press force of the spring 37, and degrading the breakage prevention effect by a large press force of the spring does not occur.

Positioning of the flanged pipe 31 in the fit groove 33 is almost determined by the balance of the elastic force of the O ring 34 and the flanged pipe 31 is positioned with good repeatability; when the spring 37 pressing the flange 31a downward exists and the press force of the spring 37 acts excessively largely as in the embodiment, a finite friction force acts between the contact faces 31c and 32d and the flanged pipe 31 becomes hard to move. That is, the friction force results in degradation of the positioning accuracy of the flanged pipe 31. The slip sheet 38 described above is inserted between the contact faces 31c and 32d, whereby it is also made possible to minimize degradation of the positioning accuracy caused by the friction force produced by the spring 37.

The slip sheet 38 also functions as a seal of assist gas applied during machining.

In the embodiment, the slip sheet 38 provides the low-friction coefficient face with the friction force lessened as shown in FIG. 3, but at least either of the contact faces may be formed with a low-friction coefficient coating. For example, if the member is aluminum, an anodized aluminum coating may be provided.

In the embodiment, the spring 37 for pressing the flanged pipe 31 is shaped like a taper so as to shrink to the wire diameter as shown in FIG. 3. As such a taper spring is used, it abutment against a workpiece in a vertical direction occurs, the margin stroke for breakage prevention is increased and the breakage prevention effect is still more enhanced.

Although the spring for pressing the flanged pipe 31 is the taper spring with a large diameter in the embodiment, a plurality of inexpensive small-diameter springs may be used.

The outer peripheral face shape of the flange 31*a* may be made a circular arc, for example, for eliminating the edge part. Such a structure makes the flange 31*a* hard to be caught in the inner face of the hollow cage member when the flange 31*a* is inclined and restored, making it possible to incline and restore the flange 31*a* more smoothly.

The flange 31*a* may be provided with a seating detection sensor or a contact sensor may be placed in the proximity of the tip nozzle section 17 and emergency stop of the laser beam machine may be executed based on a signal of the sensor.

As described above, according to the invention, the O ring engaged in the engagement part placed in the outer peripheral surface of the flange of the first machining head section opposed to the inner peripheral surface of the engaged part placed in the second machining head section and pressed against the inner peripheral surface of the engaged part is provided, whereby according to the simple structure, the breakage prevention function operates at the collision time with an obstacle of the first machining head section and the advantages that damage to the first machining head section and by extension the whole laser beam machining head, caused by the collision with the obstacle is prevented and that usually the first machining head section is held and fixed reliably are provided.

According to the invention, the engaged part in the second machining head section is formed with the tapered part, whereby if first machining head section is inclined and is placed out of engagement because of the collision with an obstacle, the O ring engaged in the engagement part placed in the outer peripheral surface of the flange slips down on the tapered part, so that the advantage that the first machining head section is restored to the former held and fixed position with good position repeatability without being left in the inclined state is provided.

Industrial Applicability

As described above the laser beam machining head according to the invention is suited for use with a three-dimensional laser beam machine, for example.

What is claimed is:

1. A laser beam machining head comprising a first machining head section having a flange in a first end part in a direction along an optical axis direction of laser light and having a laser light emission nozzle second end part, a second machining head section having an engaged part engaged with the above-mentioned flange of said first machining head section for detachably holding said first machining head section, and an O ring being engaged in an engagement part placed in an outer peripheral surface of the above-mentioned flange opposed to an inner peripheral surface of the above-mentioned engaged part and pressed against the inner peripheral surface of the above-mentioned engaged part.

2. The laser beam machining head as claimed in claim 1 wherein the engaged part is formed with a tapered part.

3. A laser beam machining head comprising a flanged pipe having a flange at a first end in a direction along an optical axis direction of laser light and having a laser light emission nozzle at an opposite end, a spring for pressing said flanged pipe against the inner face of a hollow cage member, an engagement member engaged with the above-mentioned flange of said flanged pipe and having a positioning function of said flanged pipe, and an O ring being engaged in an engagement part placed in an outer peripheral surface of the above-mentioned flange opposed to an inner peripheral surface of said engagement member and pressed against the inner peripheral surface of said engagement member.

4. The laser beam machining head as claimed in claim 3 comprising a slip sheet functioning as a low-friction coefficient face between a contact face of the flange of said flanged pipe and a contact face of the hollow cage member.

* * * * *